United States Patent
Kyoto et al.

[11] Patent Number: 5,158,587
[45] Date of Patent: Oct. 27, 1992

[54] METHOD FOR PRODUCING GLASS PREFORM FOR OPTICAL FIBER

[75] Inventors: Michihisa Kyoto; Akira Urano; Yoichi Ishiguro; Minoru Watanabe, all of Yokohama, Japan

[73] Assignee: Sumitomo Electric Industries, Ltd., Osaka, Japan

[21] Appl. No.: 726,815

[22] Filed: Jul. 8, 1991

Related U.S. Application Data

[60] Division of Ser. No. 526,522, May 21, 1990, Pat. No. 5,053,068, which is a continuation of Ser. No. 211,158, Jun. 22, 1988, abandoned, which is a continuation of Ser. No. 855,396, Apr. 24, 1986, abandoned.

[30] Foreign Application Priority Data

Apr. 25, 1985 [JP] Japan .................... 60-87580

[51] Int. Cl.$^5$ .................... C03C 25/02
[52] U.S. Cl. .................... 65/3.12; 65/DIG. 16; 65/3.14; 65/18.2; 65/30.1
[58] Field of Search .................... 65/DIG. 16, 2, 3.11, 65/3.12, 3.14, 18.2, 30.1

[56] References Cited

U.S. PATENT DOCUMENTS

| | | | |
|---|---|---|---|
| 4,579,571 | 4/1986 | Hicks | 65/3.12 |
| 4,586,943 | 5/1986 | Kyoto et al. | 65/3.12 |
| 4,629,485 | 12/1986 | Barkey | 65/3.11 |

FOREIGN PATENT DOCUMENTS 55-67533 5/1980 Japan.
56-50136 5/1981 Japan.
60-51635 3/1985 Japan.

*Primary Examiner*—W. Gary Jones
*Assistant Examiner*—John J. Bruckner
*Attorney, Agent, or Firm*—Cushman, Darby & Cushman

[57] ABSTRACT

A method for producing a glass preform for use in the fabrication of an optical fiber, which includes the steps of forming a glass soot preform from a glass-forming raw material and heating the soot preform in an atmosphere containing $SiF_4$ under a pressure higher than 2 atm. for a period of time sufficient to add fluorine during the time between the formation of the soot preform and the vitrification of it, fluorine is added at a high rate and in a larger amount.

5 Claims, 4 Drawing Sheets

METHOD FOR PRODUCING GLASS PREFORM FOR OPTICAL FIBER

This is a divisional application of Ser. No. 526,522 filed May 21, 1990, now U.S. Pat. No. 5,053,068, which is a continuation of Ser. No. 211,158, filed Jun. 22, 1988, now abandoned, which is a continuation of Ser. No. 855,396, filed Apr. 24, 1986, now abandoned.

FIELD OF THE INVENTION

The present invention relates to a method for producing a glass preform for use in the fabrication of an optical fiber. More particularly, it relates to a method for producing a glass preform for use in the fabrication of an optical fiber containing fluorine as an additive.

BACKGROUND OF THE INVENTION

A glass preform for use in the fabrication of an optical fiber is produced by various methods. Among them, the VAD method and the OVPD method are attractive methods since their productivity and quality of the fabricated optical fiber are better than other methods. These methods comprise synthesizing glass soot particles by flame hydrolysis of a glass-forming raw material and depositing the soot particles on a rotating seed material to form a porous soot preform. Then, the porous soot preform is heated in a suitable atmosphere containing various components to dehydrate and vitrify it so as to produce a transparent glass preform, which is drawn to fabricate an optical fiber.

The optical fiber comprises a core through which light is propagated and a cladding which surrounds the core and reflects light to be propagated. Numerical aperture (hereinafter referred to as "N.A.") is calculated from the average refractive indexes $n_1$ and $n_2$ of the core and the cladding as follows:

$$N.A. = \sqrt{n_1^2 - n_2^2} \quad (n_1 > n_2).$$

It is understood that the difference of the refractive index between the core and the cladding is made large to obtain a large N.A. To this end, one of following measures is taken in the case of a silica ($SiO_2$) glass type optical fiber:

1) In the core, an additive for increasing its refractive index is added.
2) In the cladding, an additive for lowering its refractive index is added.
3) Combination of the measures 1 and 2. Needless to say, the cladding in the case 1 and the core in the case 2 are made of silica glass.

Usually, $GeO_2$, $P_2O_5$, $Al_2O_3$ and $TiO_2$ are used to increase the refractive index of silica glass, and $B_2O_3$ and fluorine (F) are used to lower the refractive index of silica glass. FIG. 1 shows the variation of the refractive index of silica glass added with the various additives for light with a wavelength of 0.59 μm (cf. Kumamaru and Kurosaki, "Light Transmission Materials" in the Industrial Materials (Kogyozairyo), 27 (1979) 39).

Among the additives, fluorine has recently gained the attention of those skilled persons in this field and is being studied as an additive in the VAD method and the like.

To achieve the same difference of refractive index between the core and the clodding of the optical fiber, the measure 2 or 3 is preferred since any additive is not added to the core, or a smaller amount of the additive is added to the core than in the measure 1. This is advantageous for a high N.A. optical fiber since attenuation of light transmission due to the presence of the additive is decreased. In addition, an optical fiber having good performance in the presence of radiation can be produced only by the measure 2. Therefore, it is greatly advantageous to add the additive to the cladding so as to lower its refractive index.

In the VAD method, fluorine is added in a sintering step, namely a vitrifying step of the soot preform. This has the following advantages:

1. Fluorine is homogeneously added to achieve uniform distribution of the refractive index, and
2. The addition rate of fluorine is high. Namely, several to tens of hundreds of grams of the porous soot preform can be treated and vitrified within several hours.

In the conventional methods, even when the soot preform is heated under atmospheric pressure in an atmosphere of a 100% pure fluorine-containing compound in order to add fluorine to the preform, fluorine is added at most in an amount corresponding to −0.75% of the refractive index difference.

By other methods, for example, a plasma outside deposition method, the glass-forming raw material is deposited on the seed material by means of flame generated by plasma so as to directly vitrify the raw material on the seed material. If the fluorine-containing compound is added in the glass-forming material to add fluorine in the glass in an amount corresponding to −1% of the refractive index difference, the deposition rate of the glass is at most 0.1 g/min. and lowered as the amount of the additive is increased.

However, according to the conventional methods, including the VAD method and the plasma method, bubbles tend to undesirably remain in the glass preform when fluorine is added in an amount corresponding to −0.5% of the refractive index difference. The amount of the bubbles increases as the added amount of fluorine increases.

SUMMARY OF THE INVENTION

One object of the present invention is to provide a method for producing a glass preform containing fluorine in an increased amount with fewer or no bubbles therein.

Another object of the present invention is to provide a method for producing a glass preform by which fluorine is added at a high rate.

These and other objects are accomplished by a method for producing a glass preform for use in the fabrication of an optical fiber according to the present invention, which comprises the steps of forming a glass soot preform from a glass-forming raw material and heating the soot preform to vitrify it, wherein the soot preform is heated in an atmosphere comprising $SiF_4$ under pressure higher than 1 atm. for a period of time sufficient to add fluorine between the formation of the soot preform and the vitrification of it.

Preferably, $SiF_4$ is flowed in the atmosphere.

DETAILED DESCRIPTION OF THE INVENTION

It may be easily assumed that the reaction rate is increased by heating the porous soot preform in an atmosphere of the fluorine-containing compound under elevated pressure. However, by simply heating the porous preform in a sealed vessel pressurized with the fluorine-containing compound, any glass preform having good quality cannot be produced. This is partly because heavy metals from the vessel wall would contaminate the preform, and partly because the compound would thermally decompose so that the reaction efficiency is decreased.

In addition, any component other than fluorine such as carbon from CF$_4$ and sulfur from SF$_6$ may be contained and form bubbles in the glass. This is confirmed by the fact that the bubbles contain CO$_2$ and/or CO when CF$_4$ is used to add fluorine in the glass preform.

Since SiF$_4$ is used as the fluorine-containing compound to add fluorine in the glass preform according to the present invention, it reacts with quartz glass according to the following reaction formula (1)

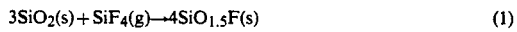

$$3SiO_2(s) + SiF_4(g) \rightarrow 4SiO_{1.5}F(s) \qquad (1)$$

wherein (s) and (g) stand for solid and gaseous states, respectively. Therefore, different from the conventional method utilizing CF$_4$ or C$_2$F$_6$ to add fluorine, any undesirable gas such as CO$_2$ or CO is not formed.

In addition, when SiF$_4$ is continuously flowed under elevated pressure, the contaminating materials from the vessel wall are removed before they reach the preform. Thereby, the surface of the preform can be kept clean.

By continuously providing fresh SiF$_4$ in the vessel an, optimum reaction rate can be maintained. This may be due to the fact that the dissociation reaction represented by the following reaction formula (2) could be suppressed:

$$SiF_4(g) \rightarrow SiF_2(g) + F_2(g) \qquad (2)$$

When SiF$_4$ is continuously flowed its flowing rate depends on other conditions such as the size of the heating vessel, the heating temperature and the like. Usually, it is not lower than 50 ml/min., preferably 100 to 500 ml/min.

Figure 1:
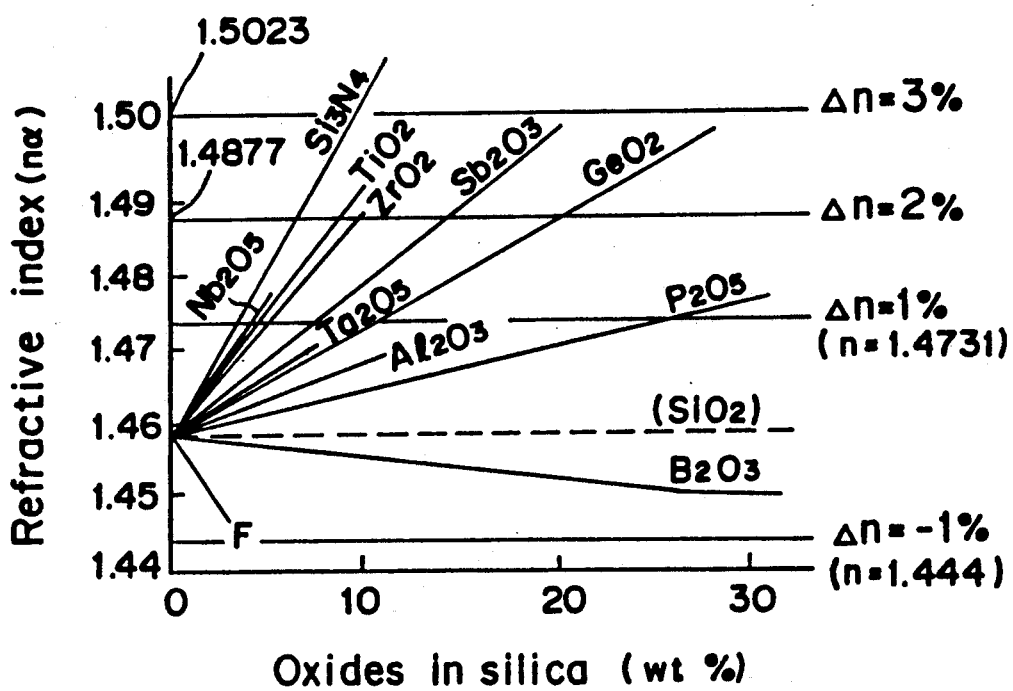
FIG. 1 is a graph showing variation of the refractive index of silica glass added with the various additives for light with a wavelength of 0.59 μm.
Figure 2:
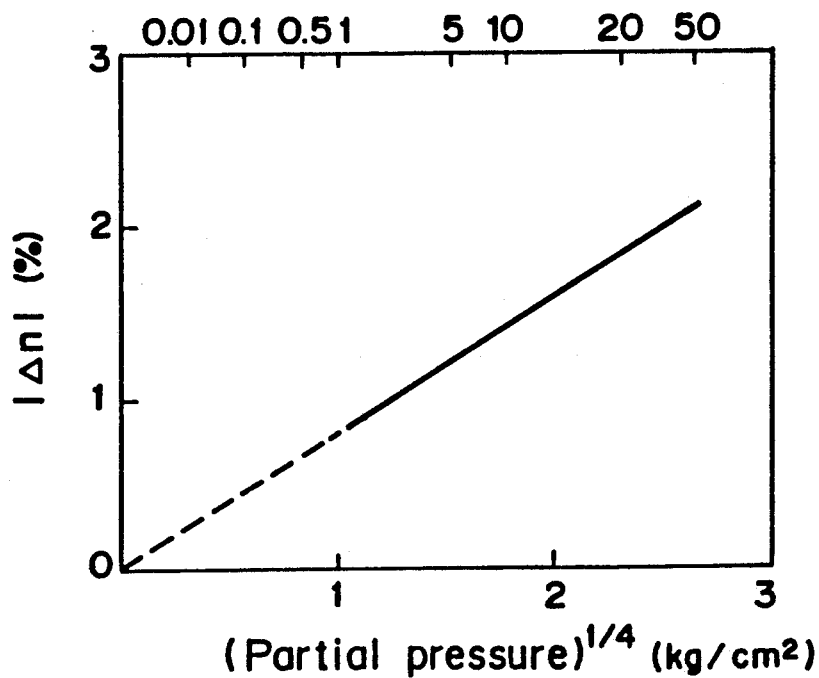
FIG. 2 is a graph showing a relationship between the partial pressure of SiF$_4$ and the difference of the refractive index from that of pure silica.

When the porous soot preform produced by the VAD method is heated at 1,200° C. for 3 hours, the relationship between the partial pressure (P) of SiF$_4$ and the difference of the refractive index ($\Delta n$) from that of pure silica is shown in FIG. 2. Under the higher pressure, fluorine is more effectively added in a larger amount so that the refractive index becomes lower.

Figure 3:
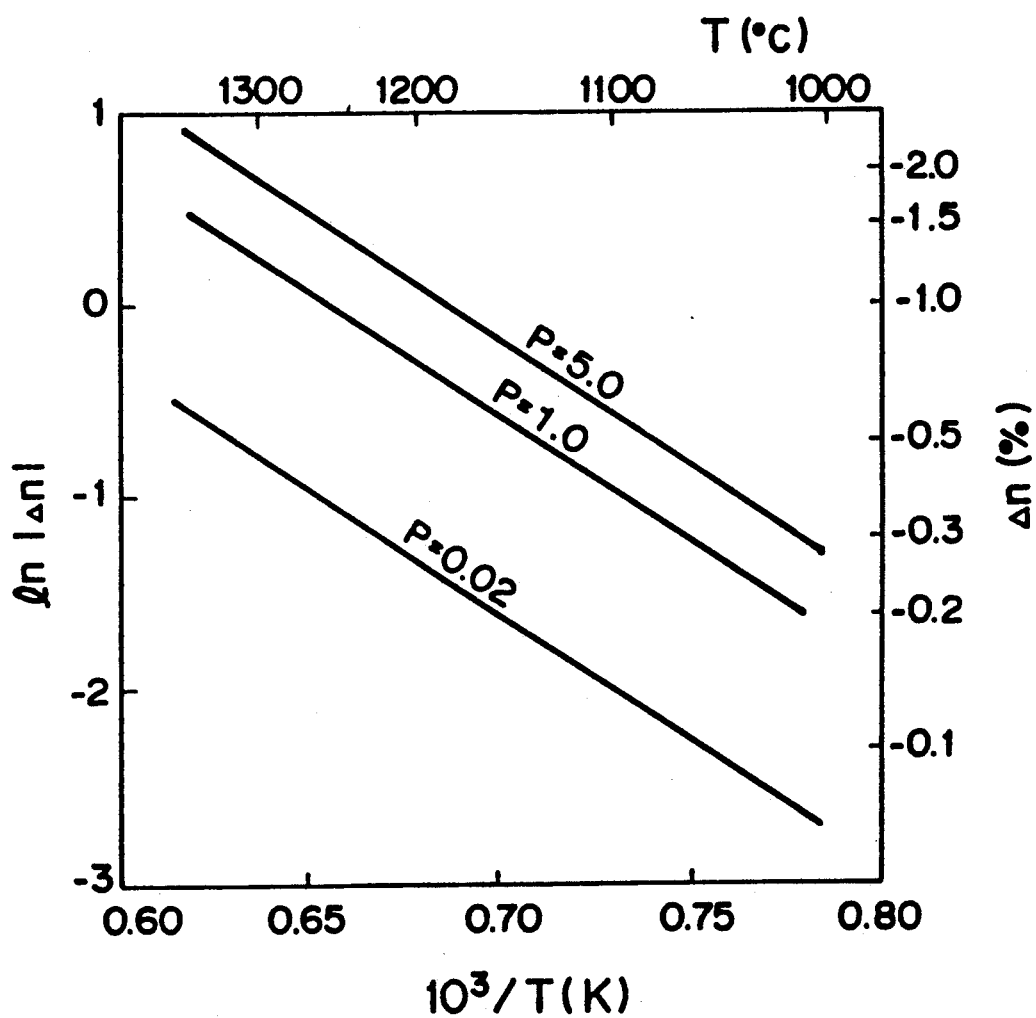
FIG. 3 is a graph showing a relationship between the heating temperature and the difference of the refractive index, and FIGS. 4 and 5 schematically show preferred embodiments of the apparatus for carrying out the method of the present invention.

The relationship between the heating temperature (T° C.) and $\Delta n$ is shown in FIG. 3. As the temperature is raised and the partial pressure of SiF$_4$ is increased, the difference of the refractive index is increased. Practically, when the partial pressure of SiF$_4$ is higher than 20 atm., or when the temperature exceeds 1,400° C., the bubbles tend to form in the glass preform. On the contrary, when the temperature is too low, the reaction does not completely proceed. Therefore, the temperature is preferably not lower than 800° C.

Figure 4:
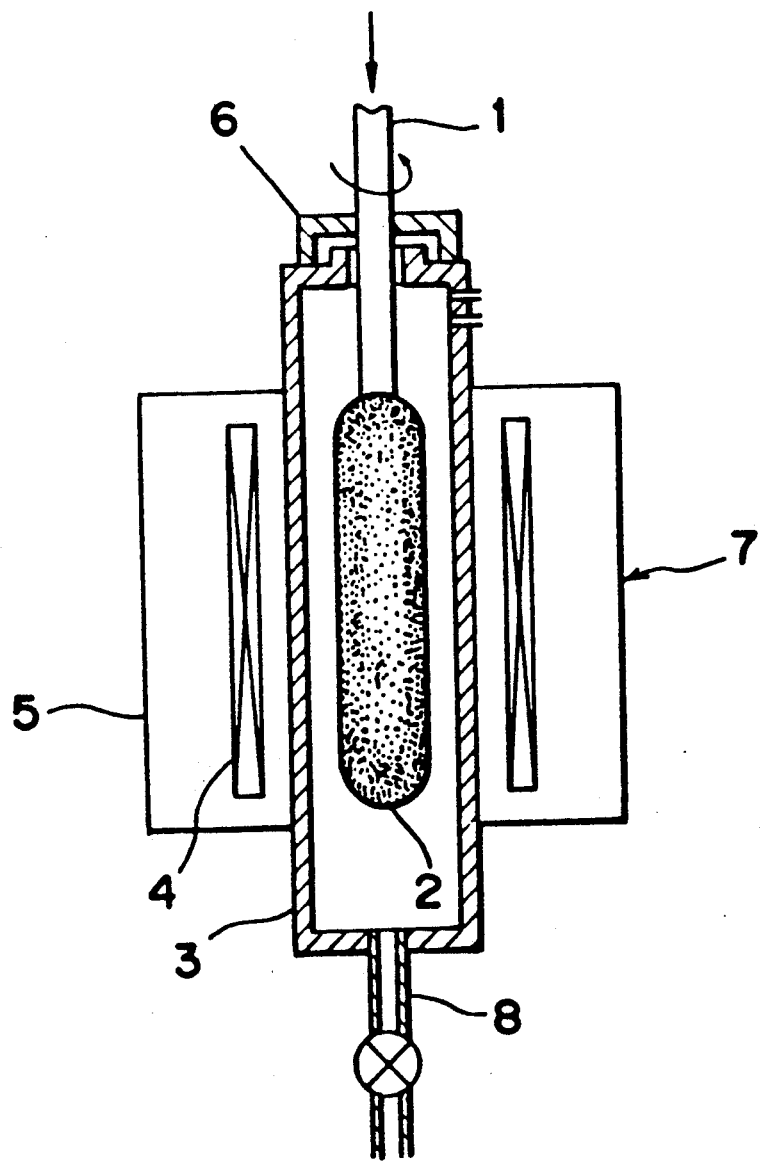
Figure 5:
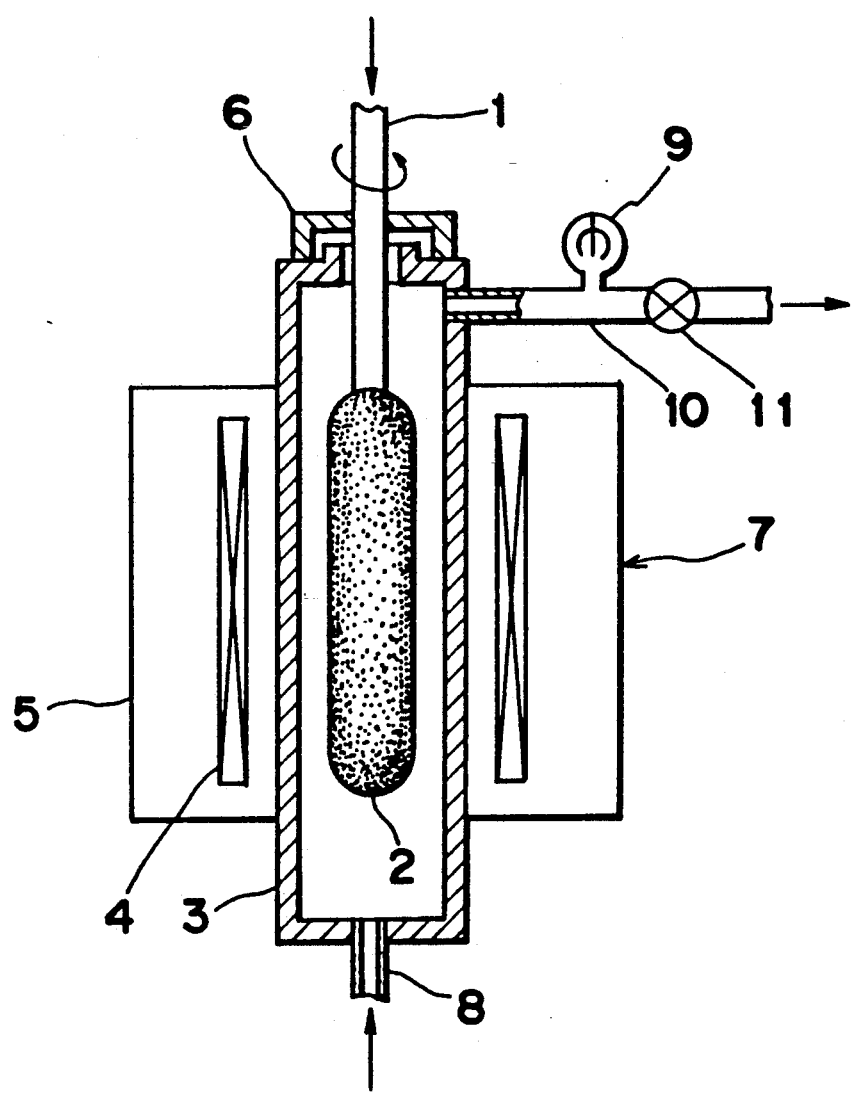

Preferred embodiments of an apparatus for carrying out the method of the present invention are schematically shown in FIGS. 4 and 5, which include a supporting rod 1, a porous soot preform 2, a pressure vessel (furnace) 3, heating sections 5 and 7 and a gas supply system 8. The apparatus of FIG. 5 further comprises a pressure gauge 9, an outlet of gas 10 and a valve 11.

Practical and presently preferred embodiments of the present invention are shown in the following examples.

EXAMPLE 1

In the apparatus of FIG. 4, a pure silica soot preform was heated in the vessel 3 containing pure SiF$_4$ under pressure of 4 atm. at 1,100° C. for 2 hours to melt and vitrify it. The difference in the refractive index ($\Delta n$) of the fluorine-added glass preform was $-1\%$ in comparison with pure silica.

The glass preform was jacketed by a quartz tube and drawn to fabricate an optical fiber, which contained few impurities and had a low attenuation of light transmission of 2 dB/km at a wavelength of 0.85 $\mu$m.

EXAMPLE 2

In the apparatus of FIG. 5, a soot preform comprising a silica glass core and porous silica glass deposited around the core was heated at 1,100° C. under 2 atm. for one hour with flowing SiF$_4$ at a rate of 2 l/min. Then, the preform was vitrified at 1,600° C. in an atmosphere mainly containing helium. The difference of the refractive index between the core and the cladding was 0.4%.

EXAMPLE 3

In the apparatus of FIG. 4, a preform comprising a core made of a GeO$_2$ added high N.A. glass with $\Delta n$ of 2% and porous silica deposited around the core was heated at 1,350° C. under 5 atm. for one hour with SiF$_4$ flowing at a rate of 50 ml/min. and vitrified at 1,800° C. under 1 atm. in helium atmosphere. The produced preform had a large N.A. with a $\Delta n$ of $-2\%$ in the cladding portion and about 4% in the core portion.

According to the method of the present invention, glass having a $|\Delta n|$ larger than 1% can be produced. Fluorine is added at a high rate. When SiF$_4$ is continuously flowed during the addition of fluorine to the porous soot preform, the reaction rate of fluorine is not decreased and less bubbles are formed in the preform. Further, a glass preform with a low $\Delta n$ of the cladding is easily formed. Such preform is advantageous for the fabrication of a high N.A. optical fiber or an optical fiber comprising a pure silica core. By the method of the present invention, contamination of the glass preform from the wall of the heating vessel (e.g. heavy metals and hydroxyl groups) can be suppressed or prevented.

What is claimed is:

1. A method for producing a silica glass preform containing fluorine for use in the fabrication of an optical fiber, which comprises the steps of:
   (1) forming a porous silica glass soot around a transparent glass rod core from a glass-forming raw material by vapor deposition to obtain a complex glass preform,
   (2) heating the complex glass preform in an atmosphere consisting of SiF$_4$ under a pressure of from 2 atm. to 20 atm. for a period of time sufficient to add fluorine to the complex glass preform during the time between formation of soot preform and a subsequent vitrification of the preform, and (3) heating the complex glass preform formed in step (2) at a higher temperature at which the complex glass preform is vitrified to form a transparent silica glass preform.

2. The method according to claim 1, wherein $SiF_4$ is continuously flowed in the heating atmosphere.

3. The method according to claim 2, wherein $SiF_4$ is flown at a rate not lower than 50 ml/min.

4. The method according to claim 1, wherein the heating temperatures are not lower than 800° C.

5. The method according to claim 4, wherein the temperatures are not lower than 800° C. and not higher than 1,400° C.

* * * * *